United States Patent [19]

Billmers et al.

[11] Patent Number: 4,929,670

[45] Date of Patent: May 29, 1990

[54] POLYSACCHARIDES CONTAINING AROMATIC ALDEHYDES AND THEIR DERIVATIZATION VIA AMINE-ALDEHYDE INTERACTIONS

[75] Inventors: Robert L. Billmers, Stockton; David M. Del Giudice, Somerset; Martin M. Tessler, Edison, all of N.J.

[73] Assignee: National Starch and Chemical Investment Holding Corporation, Bridgewater, N.J.

[21] Appl. No.: 338,827

[22] Filed: Apr. 14, 1989

Related U.S. Application Data

[62] Division of Ser. No. 112,634, Oct. 26, 1987, Pat. No. 4,839,449.

[51] Int. Cl.$^5$ .................. C08F 89/00; C08L 1/00; D02G 3/02; A61K 37/02
[52] U.S. Cl. .................. 525/54.1; 530/813; 530/814
[58] Field of Search ............ 525/54.1; 530/813, 814

[56] References Cited

U.S. PATENT DOCUMENTS

| | | | |
|---|---|---|---|
| 3,706,633 | 12/1972 | Katachalski et al. | 435/178 |
| 4,663,448 | 5/1987 | Chiu | 536/111 |
| 4,741,804 | 5/1988 | Solarek et al. | 536/111 |
| 4,788,280 | 11/1988 | Billmers et al. | 536/104 |
| 4,801,699 | 1/1988 | Jobe et al. | 536/59 |
| 4,857,505 | 8/1989 | Arendt | 530/813 |

FOREIGN PATENT DOCUMENTS

934571 8/1963 United Kingdom .

OTHER PUBLICATIONS

Chemical Abstracts, vol. 98, 200152m, 1983, Japanese Patent 57202362 dated 12/82.

*Primary Examiner*—John Kight, III
*Assistant Examiner*—Nathan M. Nutter
*Attorney, Agent, or Firm*—Margaret B. Kelley; Edwin M. Szala

[57] ABSTRACT

A polysaccharide derivative having the structure Sacch—O—Z—Ar—CH=N—Y or

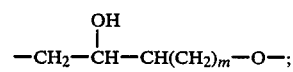

where Sacch—O— represents a polysaccharide molecule; Z is —$(CH_2)_n$— or

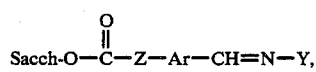

Ar is a divalent aromatic group; Y is (a) a monovalent group derived from a water-soluble substituted or unsubstituted aromatic compound containing only one free primary amine group, or (b) a monovalent group derived from a water-soluble substituted or unsubstituted aliphatic or cycloaliphatic compound containing only one primary amine group, or (c) a multivalent group derived from a water-soluble protein containing more than one primary amine group; n is one or greater; and m is zero or greater, is prepared by first modifying the polysaccharide with a reagent to introduce free aromatic aldehyde groups and then reacting with a suitable amine-containing reagent. The siloxane-containing starch derivatives are useful in glass forming size compositions.

17 Claims, No Drawings

POLYSACCHARIDES CONTAINING AROMATIC ALDEHYDES AND THEIR DERIVATIZATION VIA AMINE-ALDEHYDE INTERACTIONS

This application is a division of application Ser. No. 112,634, filed Oct. 26, 1989, and now U.S. Pat. No. 4,839,449.

BACKGROUND OF THE INVENTION

The present invention relates to polysaccharide derivatives which contain substitutents which are the reaction product of an aromatic aldehyde group present on the polysaccharide and selected reagents containing no more than one free primary amine group.

Dialdehyde starches are known. Their major uses reflect the reactive nature of the polymeric polyaldehyde in cross-linking substrates containing amino, hydroxyl, and imino groups. See U.S. Pat. No. 3,706,633 (issued Dec. 19, 1972 to E. Katchalski et al.) which discloses the condensation of a dialdehyde starch with an alkylene diamine to produce a highly crosslinked polymeric product which is then reduced, diazotized, and coupled with an active enzyme. *Japanese Kokai No. 57,202,362* (published on Dec. 11, 1982 - CA 98:200152m) discloses water resistant aqueous adhesive compositions containing starch or a starch derivative containing at least two aldehyde groups (e.g., starch dialdehyde) and a compound containing at least two isocyanate groups (e.g., polymethylene-polyphenylene polyisocyanate).

The present invention also relates to a method for preparing glass fibers and in particular to the application of a forming size to continuous filament glass fiber strands.

Glass fibers are produced by a means whereby a molten glass composition is flowed or pulled through tiny orifices or tips in a heated platinum bushing. The individual glass filaments are passed through a sizing bath, grouped into a strand, and then wound on a rapidly rotating forming tube. A size is applied to the filaments in order to bind them together, maintain the integrity of the strand during winding and unwinding, as well as facilitate eventual processing. The strand on the forming tube is thereafter placed in an oven to dry or is allowed to air dry to reduce the moisture content of the strand.

Many different compositions have been used as glass forming sizes. Typically, the sizes have comprised aqueous dispersions of various modified and unmodified starches and oils. The following patents are directed to such compositions:

U.S. Pat. No. 3,227,192 (issued Jan. 4, 1966 to D. Griffiths) discloses an aqueous forming size containing an amylose starch mixture containing approximately equal portions of a high amylose starch component having an amylose content of about 50–60% and a low amylose starch component having an amylose content of about 20–30%.

U.S. Pat. No. 3,167,468 (issued Jan. 26, 1965 to J. Lovelace et al.) discloses an aqueous forming size containing a starch ether or ester which is the reaction product of starch and a tertiary or quaternary amine.

U.S. Pat. No. 3,481,771 (issued Dec. 2, 1969 to A. Doering) discloses an aqueous forming size dispersion having a low metallic ion content which employs an uninhibited or inhibited (i.e., crosslinked) starch ether or ester derivative. Among the applicable starch esters are acetates, propionates, butyrates, laurates, stearates and oleates. Suitable crosslinking agents include aliphatic dihalides, ether forming epoxy halogen compounds (i.e., epichlorohydrin), polyfunctional reagents (i.e., phosphorus oxychloride, mixed anhydrides, and succinic anhydride).

U.S. Pat. No. 3,615,311 (issued Oct. 26, 1971 to R. Ignatius) discloses a forming size containing a cationic starch ether or ester and an underivatized starch that is preferably high in amylose.

U.S. Pat. Nos. 3,664,855 and 3,793,065 (issued May 23, 1972 and Feb. 19, 1974, respectively, to A. Morrison et al.) employ starch ethers and esters of a substituted or unsubstituted monocyclic 5 or 6 member hydrocarbon ring in a glass forming size composition.

U.S. Pat. No. 3,928,666 (issued Dec. 23, 1975 to Morrison et al.) employs a starch ester of a $C_4$–$C_6$ isoalkanoic acid in a glass forming size composition.

U.S. Pat. No. 4,166,872 (issued Sept. 4, 1979 to R. Karpik et al.) is directed to a migration-resistant forming size which contains a portion of swollen but unburst partially cooked starch granules, preferably from a high amylose corn hybrid.

U.S. Pat. No. 4,168,345 (issued Sept. 18, 1979 to B. de Massey at al.) is directed to a glass forming size composition containing both a modified starch of low viscosity and an acrylic polymer film-forming agent. The useful starch is modified by treatments including etherification, esterification, cationization or acid hydrolysis.

There is always a need for new polysaccharide derivatives, especially derivatives containing silane groups, which are useful for glass forming sizes with improved adhesion to glass.

SUMMARY OF THE INVENTION

The present invention provides a polysaccharide derivative having the structure Sacch—O—Z—Ar—CH=N—Y or

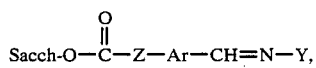

where Sacch—O— represents a polysaccharide molecule; Z is —$(CH_2)_n$— or

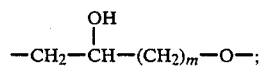

Ar is a divalent aromatic group; Y is (a) a monovalent group derived from a water-soluble substituted or unsubstituted aromatic compound containing only one free primary amine group, or (b) a monovalent group derived from a water-soluble substituted or unsubstituted aliphatic or cycloaliphatic compound containing only one primary amine group, or (c) a multivalent group derived from a water-soluble protein containing more than one primary amine group; n is one or greater; and m is zero or greater. Preferably, n is one, m is zero, and Ar has the structure

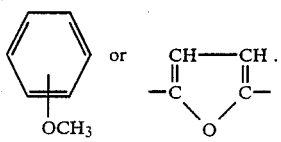 or 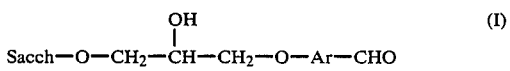

The polysaccharides are first modified by derivatization to provide free aromatic (including heteroaromatic) aldehyde groups. Polysaccharide ether derivatives where there is an aldehyde group present on an aromatic ring may have the formula $$\text{Sacch-O-CH}_2\text{-CH(OH)-CH}_2\text{-O-Ar-CHO} \quad (I)$$

or Sacch—O—CH$_2$Ar—CHO (II). Polysaccharide ester derivatives where there is an aldehyde group present on an aromatic ring may have the formula $$\text{Sacch-O-C(=O)-CH}_2\text{-O-CH}_2\text{-Ar-CHO} \quad (III)$$

Sacch—O— represents a polysaccharide molecule (wherein the hydrogen of a hydroxyl group of a saccharide unit has been replaced as shown) and Ar is a divalent aryl group which can contain an ether linkage or an alkaryl group. As used herein, the term alkaryl is intended to denote a divalent group linked to the polysaccharide through the alkyl portion of the alkaryl group and linked to the aldehyde (—CHO) group or acetal group

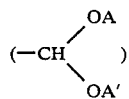

through the aromatic portion of the alkaryl group, and the term aromatic ring is intended to include not only aromatic hydrocarbons but also heteroaromatic systems. In the above acetal, and A and A' are independently a lower alkyl or A and A' together form at least a 5-membered cyclic acetal. The polysaccharide molecule may be modified by the introduction of cationic, anionic, nonionic, amphoteric, and/or zwitterionic substituent groups, provided the cationic groups are not free primary amine groups. As used herein, the terms "cationic" and "anionic" are intended to cover cationogenic and anionogenic groups.

The aromatic aldehydes of formula I are prepared by hydrolyzing the corresponding acetal at a pH of less than 7, preferably 5 or less, most preferably 2-3. The acetals are prepared by reacting the polysaccharide with an acetal reagent having the general structure

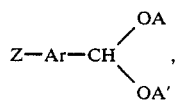

where Z is an organic group capable of reacting with the saccharide molecule to form an ether derivative and selected from the group consisting of an epoxide, a halohydrin, an ethylenically unsaturated group, or a reactive halogen.

A typical reagent is as follows:

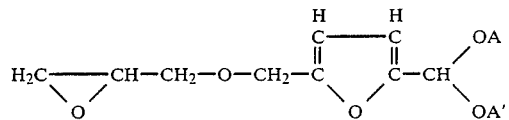

It can be prepared by converting an alcohol-containing aldehyde (e.g., 5-hydroxymethyl furfuraldehyde) to the acetal by treatment with an excess of an anhydrous alcohol (e.g., methanol) in the presence of a trace amount of an acid. The acetal is then reacted with an epihalohydrin (e.g., epichlorohydrin) under conditions that will not affect the acetal group (i.e., under alkaline conditions). The epihalohydrin reaction is described in an article by R. Pozniak and J. Chlebicki entitled "Synthesis of Higher N-(2-Hydroxy-3-alkoxypropyl) ethanolamines and N-(2-Hydroxy-3-alkoxypropyl)diethanolamines", Polish J. Chem. 52, p. 1283 (1978).

The aromatic aldehydes of formula II are prepared by the chloromethylation of an aromatic aldehyde and the subsequent derivatization of a polysaccharide with the reaction product. The chloromethylation procedure described in C.A. 31, 7412:6 (1937) is suitable for the chloromethylation of o-anisaldehyde and m-nitrobenzaldehyde. The procedure is modified in that concentrated hydrochloric acid is used rather than dry hydrogen chloride gas. For example, a mixture of o-anisaldehyde, concentrated hydrochloric acid, and p-formaldehyde is stirred for 48 hours at room temperature, the precipitated product is filtered off, and the resulting product is washed with a sodium bicarbonate solution (0.5%) and then with distilled water until neutral, and dried in vacuum. The chloromethylation of benzaldehyde and naphthalene carboxaldehyde is carried out in a similar manner as described in Organic Reactions, edited by Roger Adams, Vol. I, pp. 67 and 70, John Wiley and Sons, Inc., New York 1942.

The aromatic aldehydes of formula III are prepared in the same way as those of formula I except that Z is an organic group capable of reacting with the saccharide molecule to form an ester derivative and selected from the group consisting of an epoxide, a halohydrin, an ethylenically unsaturated group, or a reactive halogen.

These free aldehydes, being unreactive with the hydroxy groups on the polysaccharide, serve as sites for further modification. This further modification is accomplished by reaction with a reagent which must contain only one free primary amine group. The reaction is carried out by slurrying the aromatic aldehyde-containing polysaccharide in water and/or a solvent depending upon the reagent selected. Excess reagent is removed by filtration and the derivative is washed with water and/or a solvent. Typically, the reaction is done at room temperature. When the reagent is a water-soluble aromatic amine, it is necessary to carry out the reaction above room temperature in a solvent, e.g., ethanol. The temperature required will depend upon the reagent. The reaction is carried out without the addition of an acid or a base. Because of the very mild conditions required for this modification, derivatives can be prepared that could not have been made using standard techniques.

When the polysaccharide is a starch, the derivatization to introduce the aromatic aldehyde groups can be carried out while the starch is still in the granular form, and the further modification with amine-containing reagent can be carried out on the granular aldehyde-containing starch. The fact that the chemistry can be done in the granular form is unique.

The present invention also provides a glass forming size composition which comprises an aqueous dispersion of:

(a) about 40–70% of the reaction product of a starch derivative having the structure ST—O—Z—Ar—CH=N—R—Si (OR')$_3$, wherein St is the residue of a starch molecule after the removal of the hydrogen of a hydroxyl group; Z is (—CH$_2$—)$_n$ or

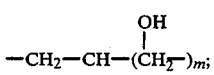

Ar is a divalent aromatic group; R is —CH$_2$—CH$_2$—CH$_2$—; and R' is a C$_1$–C$_4$ alkyl group;

(b) about 15–40% of a nonionic oil;
(c) about 2–8% of an emulsifier;
(d) about 5–15% of a cationic lubricant, with the percentages being by weight and totalling 100%. The preferred amounts are 60% of the starch derivative, 25% of the nonionic oil, 5% of the emulsifier, and 10% of the cationic lubricant.

The present invention also provides a method of sizing glass fibers comprising applying the above composition to the fibers upon formation. The glass fibers sized with this exhibit improved adhesion of the sizing composition to the glass fiber.

DESCRIPTION OF THE PREFERRED EMBODIMENTS

When the polysaccharide is starch, applicable starch bases which may be used herein may be derived from any plant source including corn, potato, sweet potato, wheat, rice, sago, tapioca, waxy maize, sorghum, high amylose corn, or the like. Starch flours may also be used as a starch source. Also included are the conversion products derived from any of the former bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized and crosslinked starches. The starch base may be a granular starch (or a gelatinized starch, i.e. non-granular starch).

When the polysaccharide is gum, applicable bases which may be used herein are polygalactomannans, which are heteropolysaccharides composed principally of long chains of 1→4 β-D-mannopyronosyl units to which single unit side chains of α-D-galactopyranosyl units are joined by 1→6 linkages and hereafter referred to as "gums". Also included are degraded gum products resulting from the hydrolytic action of acid, heat, shear, and/or enzyme; oxidized gums; and derivatized gums. The preferred gums include guar gum and locust bean gum because of their commercial availability.

When the polysaccharide is cellulose, applicable bases useful herein include cellulose and cellulose derivatives, especially water-soluble cellulose ethers such as alkyl and hydroxyalkyl cellulose, specifically methylcellulose, hydroxypropylmethylcellulose, hydroxybutylmethylcellulose, hydroxyethylmethylcellulose, and ethylhydroxyethylcellulose.

Methods for preparing the modified polysaccharide bases are well known to those skilled in the art and discussed in the literature. See, for example, R. L. Whistler, Methods in Carbohydrate Chemistry, Vol. IV, 1964, pp. 279–331; R. L. Whistler et al., Starch-Chemistry and Technology, Vol. II, 1967, pp. 293–430; R. L. Davidson and N. Sittig, Water-Soluble Resins, 2nd Ed., 1968, Chapter 2; and R. L. Davidson, Handbook of Water-Soluble Gums and Resins, 1980, Chapters, 3, 4, 12, and 13 directed to cellulose derivatives, Chapter 6 and 14 directed to gums, and Chapter 22 directed to starch. Granular reactions are typically accomplished in water at 20°–50° C., preferably about 40°–45° C. Non-granular starch reactions may be carried out at higher temperatures (e.g., up to 100° C.). The reaction mixture is preferably agitated. Reaction time may vary from about 0.5–40 hours, preferably 8–30 hours, for aqueous reactions or about 1–8 hours for reactions carried out in a substantially dry reaction medium. It will depend on such factors as the amount of reagent employed, the temperature, the scale of the reaction, and the degree of substitution desired. The pH is maintained at about 10–13, preferably 11–12, during the reagent addition and during the entire reaction using a base such as sodium, potassium, or calcium hydroxide. Sodium sulfate is typically added to the reaction to reduce swelling of the granular starch; it is not used when calcium hydroxide is the base. After completion of the reaction, the excess alkali is neutralized and the pH adjusted to about 4–8, preferably 7–8, using any conventional acid, preferably hydrochloric or sulfuric acid, prior to recovery of the starch.

The gum reactions with the acetal reagents are carried out in a two-phase reaction system comprising an aqueous solution of a water-miscible solvent and a water-soluble reagent in contact with the solid gum. The water content may vary from 10 to 60% by weight depending upon the water-miscible solvent selected. If too much water is present in the reaction system, the gum may swell and enter into solution thereby complicating the recovery and purification of the derivative. The water miscible solvent is added in the amount sufficient for the preparation of a slurry which can be agitated and pumped. The weight ratio of water-miscible solvent to gum may vary from 1:1 to 10:1, preferably from 1.5:1 to 5:1. Suitable water-miscible solvents include alkanols, glycols, cyclic and acrylic alkyl ethers, alkanones, dialkylformamide and mixtures thereof. Typical solvents include methanol, ethanol, isopropanol, secondary pentanol, ethylene glycol, acetone, methylethylketone, diethyl-ketone, tetrahydrofuran, dioxane, and dimethylformamide. The reaction times and temperatures used for the aqueous reactions are suitable for the solvent reaction.

The cellulose reaction with acetal reagents are conveniently carried out using the procedure of U.S. Pat. No. 4,129,772 (issued Dec. 12, 1978 to C. P. Iovine et al.). The cellulose or cellulose derivative is suspended in an organic solvent and a water solution of the derivatizing reagent is added thereto. Derivatization in the resulting two-phase mixture is ordinarily carried out with agitation at temperatures of 30° C. to 85° C., adding alkali if necessary to effect the reaction. At least one of the two initial phases (i.e., the suspended cellulose or cellulose derivative or the aqueous reagent solution) contains a suitable surfactant. It is important that the organic solvent used in the initial cellulose phase be immiscible with the aqueous derivatizing reagent phase, that it not dissolve the cellulose derivative as it is formed, that it have a boiling point at or above the temperature of the derivatizing reaction, that it be insensitive to alkali and not participate in the derivatization reaction.

The two phase procedure may also be used to prepare starch or gum derivatives as well as cellulose derivatives. It may also be used to prepare derivatives containing substituents derived from different reagents without isolating the substitution product from each reagent. This multiple substitution may be accomplished by the addition of several different reagents to the substrate-surfactant alkali mixture at the same time or sequentially.

After completion of the acetal reaction, the solid polysaccharide acetals may be separated, if desired, from the reaction mixture by centrifugation or filtration. Preferably, the derivative is purified by washing in a solvent in which the reagent is soluble and the polysaccharide is not. In the case of starch derivatives, water and/or a solvent are used. In the case of the gum derivatives, a solvent is used. In the case of cellulose derivatives, an aqueous solution of water miscible solvent is used. Further washing with a more anhydrous form of the same solvent may be desired for the gum derivatives. The derivatives are then air dried using conventional methods, as in a vacuum, drum, flash, belt or spray drier. If the polysaccharide is in solution when derivatized, other methods of purification (e.g., dialysis) and/or recovery (e.g., precipitation) will have to be used.

The conversion (i.e., hydrolysis) of the polysaccharide acetal to the aldehyde is carried out under acidic conditions, typically at a pH of 7 or less, preferably 5 or less, most preferably at about 2–3. It may be carried out directly without isolation of the acetal or the acetal may be isolated and resuspended in water prior to conversion. If desired, the derivatives may be recovered as described above.

Conversion of the starch acetal in the granular form is carried out by slurrying the polysaccharide in water at a pH of less than 7, preferably less than 5, most preferably 2–3. The slurry is agitated for a period of time, preferably 1–18 hours, to afford the maximum hydrolysis with a minimum of degradation to the polysaccharide backbone. Mild heating can be used to facilitate the hydrolysis, with the preferred range being 20°–35° C. If heating is carried out above the gelatinization temperature of the starch acetal, the starch will be in dispersed form.

Modification of granular aldehyde starches with compounds that contain the free primary aliphatic amines is carried out in either an aqueous or non-aqueous slurry. The pH for this reaction is in the range of 2–13, most preferably 7–12. The reaction time varies depending on factors such as solubility of the amine in the solvent, temperature of the slurry, pH of the slurry, type of base starch used, salt concentration, but will usually be in the range of 1–18 hours, preferably 1–4 hours. Purification of the newly derivatized polysaccharide is carried out by standard techniques (e.g., filtration, centrafugation, etc.).

The aldehyde starches may be modified with the amine-containing reagents in the dispersed form using conditions similar to those described above. Recovery and purification must be carried out using different techniques, such as precipitation, freeze drying, or spray drying. The aldehydes need not be in the granular form if reaction with amine-containing reagents is to be accomplished in the dispersed state. Slurry reactions can also be accomplished on non-granular polysaccharides if certain solvents (e.g., alcohols) are used in place of water.

In addition to preparing the above acetal, aldehyde, or aldehyde-amine derivatives, modified derivatives may be prepared which contain other substituent groups, hydroxyalkyl groups (e.g., hydroxypropyl ether groups), carboxyalkyl ether groups (e.g., carboxymethyl), ester groups (e.g., acetate groups), tertiary amino groups (e.g., diethylaminoethyl ether groups), and quaternary amine groups (e.g., 3-(trimethylammonium chloride)-2-butenyl groups), introduced prior to or subsequent to reaction with the acetal derivatizing reagent or introduced simultaneously by reaction with the acetal reagent and other derivatizing reagent. The practitioner will recognize that reactions with reagents introducing labile ester groups should be carried out after the other derivatizations to avoid ester hydrolysis under the alkali conditions used to prepare other derivatives.

The starch may be cooked prior to derivatization to form the acetal, subsequent to derivatization, after conversion to the aldehyde, or most conveniently during conversion of the acetal to the aldehyde. Cooking at a pH of less than 7 simultaneously converts the acetal to aldehyde and solubilizes and disperses the starch aldehyde. Any conventional cooking procedure may be used, such as cooking a slurry containing the water-soluble or water-swellable derivatives in a boiling water bath for 20 minutes, blowing in steam to heat the slurry to about 93° C. (200° F.), or jet cooking. If a water-dispersible or water-soluble starch base is used for the preparation of the acetal, it will not be necessary to cook the acetal during the acid hydrolysis.

Acetal-containing derivatives suitable for reaction with the polysaccharides include 5-glycidoxy furfuraldehyde dimethyl acetal, 4-glycidoxybenzaldehyde dimethyl acetal, 2-glycidoxy-1-naphthalene carboxyaldehyde dimethyl acetal (prepared by reacting 2-glycidoxy-1-napthalene carboxaldehyde with ammonium nitrate and trimethyl ortho formate), 3-glycidoxy-4-pyridine carboxaldehyde dimethyl acetal (prepared by reacting with ammonium nitrate and trimethyl ortho formate), 5-glycidoxymethyl-2-thiophene carboxaldehyde dimethyl acetal (prepared by reacting 5-hydroxymethyl-2-thiophene carboxaldehyde dimethyl acetal with epichlorohydrin and sodium hydroxide), 5-glycidoxymethyl-2-pyridine carboxaldehyde dimethyl acetal (prepared by reacting 5-hydroxymethyl-2-pyridine carboxaldehyde dimethyl acetal with epichlorohydrin and sodium hydroxide).

The reagents suitable for reaction with the polysaccharides to introduce the aldehyde groups directly include 5-chloromethyl-2-anisaldehyde, 5-chloromethyl furfuraldehyde. Also suitable are 3-nitro-5-chloromethylbenzaldehyde, m-chloromethylbenzaldehyde, and 3-chloromethyl-1-naphthalene carboxaldehyde and/or 8-chloromethyl-1-naphthalene carboxaldehyde.

The aldehyde-containing polysaccharide derivatives are further reacted with reagents containing no more than one free primary amine. If a reagent other than a water-soluble protein is used which contains more than one free primary amine, a crosslinked product will result. If one or more of the primary amines are blocked, the reagent can be used. Suitable reagents include water-soluble aliphatic primary amines such as ethanol amine. Also suitable are water-soluble aromatic amines; however, the reaction with these amines must be carried out at an elevated temperature in a solvent, e.g., ethanol. Also suitable are water-soluble synthetic polymers containing only one free primary amine (e.g., polyethylene glycol end-capped with an amine at one end) and water-soluble amino acids containing only one free primary amine (e.g., alanine). Water-soluble proteins which contain more than one primary amine (e.g., caseinate) are also suitable for use herein. The amines may contain substituents such as hydroxyl, silane, carboxyl, ester, amide, ketone, acetal, thiol, sulfide, sulfoxide, sulfone, sulfonic acid, phosphonic acid, and the like.

The reaction of the aldehyde-containing polysaccharide and the amine-containing reagents are carried out as described above except that no acids or base is used in the reactions.

The aqueous size composition of the present invention will typically have a solids content of about 1-10% by weight wherein the silane-containing starch derivative is present in an amount ranging from about 40-70%, and preferably 60% of the total composition. Preferably, the size composition contains on the order of about 6% solids. The total solids should be at a level whereby the viscosity of the size dispersion is acceptable for application to the glass filaments, i.e., not exceeding 25 centipose at 60° C.

The nonionic oils used for the fiber size composition may be selected from vegetable, animal, or mineral oils, and are preferably hydrogenated to reduce their flowability. The oils are preferably fatty triglycerides including, for example, hydrogenated soybean oil, hydrogenated corn oil, glycerol tristearate, hydrogenated glycerol trioleate, and the like. The oil will typically be present in the size formulation in amounts ranging from about 25% of the total composition and is preferably employed in an amount ranging from 30 to 65%, based on the total starch concentration.

The size composition also preferably contains an emulsifying agent, typically present in amounts ranging from about 2-8% of the total size composition. HLB values between about 8 and 17 are most suitable with polyoxyalkylenesorbitans being preferred. Such emulsifiers are commercially available and include TWEEN 81 ® from ICI Americas Inc., which is a polyethylene derivative of sorbitan mono-oleate. TRITON ® emulsifiers, polyoxy ethylene derivatives of alkyl substituted phenols, obtained from Rohm and Haas are also useful herein.

Cationic glass fiber lubricants used in the art to serve primarily as a lubricant prior to the time the size fibers are dried may optionally be employed in the present composition in an amount of less than about 15% of the total size composition. Such lubricants include, for example, alkyl imidazoline derivatives (i.e., the reaction product of tetra ethylene pentamine and stearic acid) and quartenary peridinium compounds.

Other conventional glass forming size additives including, for example, solid unctuous material such as wax, fat, or gelled oils which do not flow at application temperatures; secondary film formers such as gelatin, polyvinyl alcohol and polyacrylates; silane coupling agents; mildew preventatives; and fungicides may also be employed in the present composition in conventional amounts.

The size compositions herein may be prepared and applied to the glass fibers upon formation by conventional means. An aqueous slurry of the starch derivative is preferably cooked for a period of time to gelatinize a portion of the starch while maintaining a quantity of the starch in a swollen, unburst granular form. Thereafter, an emulsion of the nonionic oil and emulsifiers are typically added to the starch slurry along with any additional size ingredients prior to application. The size composition may then be applied in an elevated temperature (typically 55°-60° C.) by a suitable application method, such as by the employment of an apron type applicator or other conventional means including a padder or roll apparatus, an immersion apparatus or by spray or jet means, all of which are well known to those skilled in the art.

The resulting derivatives are useful as liquid adhesives; oil emulsifiers, particularly when the amine used for the reaction with the aldehyde is a long chain amine; and as glass forming sizes, especially when the amine used for the reaction with the aldehyde is a silane-containing amine and when the polysaccharide substrate is starch.

It can be appreciated by the practitioner that a large number of variations may be effected in selecting the acetal derivatizing reagents, reacting them with the bases, converting them to the aldehydes, and utilizing the aldehyde derivatives as paper wet end additives or in corrugating adhesives in accordance with the procedure described above without materially departing from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide.

The nitrogen content of the cationic bases and resulting acetals was measured by the Kjeldahl method and is based on dry polysaccharide.

The presence of aldehyde groups are determined qualitatively by the viscosity increase of a cooked slurry and/or gel formation upon the addition of an aldehyde crosslinking agent and quantitatively by titration. The quantitative test is carried out by slurrying 5.0 g. of the polysaccharide acetal in sufficient distilled water to give 500 g. The pH is adjusted to 2.5 with hydrochloric acid. The polysaccharide is dispersed by cooking in a boiling water bath for 20 minutes. The dispersed polysaccharide is cooked and the solids determined. A 100 g. portion of the polysaccharide dispersion is weighed out, titrated with 0.1 NaOH to the first end point (inflection point is between pH 4 and 5) and the ml. of NaOH required is recorded ($T_1$). An aqueous solution (50 ml.) of hydroxylamine hydrochloride (prepared by dissolving 34.75 g. of the hydroxylamine hydrochloride in 1000 ml. volumetric flask and diluting to the mark with water) is added to a 100 g. portion of the polysaccharide dispersion, heated at reflux for 60 min., and titrated with 0.1N NaOH to pH 4.5. The ml. of NaOH required to reach the inflection point (pH 3.0-3.5) is recorded ($T_2$).

$$\% \text{ aldehyde} = \frac{(T_2 - T_1) \times (\text{normality of NaOH}) \times (2.9)}{\text{polysaccharide weight*}}$$

*polysaccharide weight = 100 g. × % solids of dispersed polysaccharide.

Best resulys are obtained using an automatic titrator. A blank of base polysaccharide (i.e., unmodified by the introduction of acetal groups) may also be run.

EXAMPLE I

This example describes the preparation of acetal containing starch ether derivatives having the structure ST—O—CH$_2$—CH(OH)—CH$_2$—O—Ar—CH(OCH$_3$)$_2$ and aldehyde-containing starch derivatives having the structure ST—O—CH$_2$CH(OH)—CH$_2$—O—Ar—CHO, where Ar is

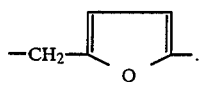

The aldehyde-containing starch ether derivative is further modified by reaction with ethanol amine to give an ether derivative having the structure

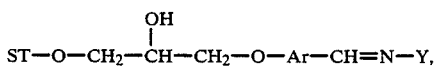

where Ar is

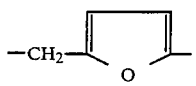

and Y is —CH$_2$—CH$_2$—OH.

Part A - Preparation of The Acetal-Containing Reagents

5-Hydroxymethyl furfuraldehyde dimethyl acetal was prepared by dissolving a total of 5.0 g. (0.039 mole) of 5-hydroxymethyl furfuraldehyde in 150 ml of anhydrous methanol and placing the mixture in a 250 ml round bottom flask equipped with magnetic stir bar and drying tube. One drop of hydrochloric acid was added and the solution was allowed to stir overnight. The reaction mixture was then neutralized with sodium carbonate, filtered, and the solvent removed under vacuum. The resulting red brown oil was determined by NMR to be 98% acetal.

5-Glycidoxymethyl furfuraldehyde dimethyl acetal was prepared by adding a total of 6.0 g (0.035 mole) of 5-hydroxymethyl furfuraldehyde dimethyl acetal (HMFA) to 1.54 g sodium hydroxide (0.038 mole) in a 100 ml round bottom flask equipped with magnetic stir bar, reflux condenser, and nitrogen inlet. After stirring for 30 min., 3.89 g (0.042 mole) of epichlorohydrin in 50 ml. of methyl ethyl ketone was added quickly, and the reaction mixture was allowed to reflux overnight under an inert (nitrogen) atmosphere. The mixture was then cooled, filtered, and the solvent removed under vacuum. The resulting oil was mixed with 250 ml of toluene and the toluene was distilled off at atmospheric pressure to remove any residual epichlorohydrin. The sample was freed of toluene by subjecting it to high vacuum overnight.

Part B - Preparation of The Acetal-Containing Starch Ether Derivatives

The following procedure was used to prepare the starch derivatives. A solution of 9.0 g sodium sulfate (36% based on starch) was dissolved in 40 mls of distilled water and 0.375 g sodium hydroxide (1.5% based on starch) was dissolved in the salt solution. A total of 25 g of starch was added quickly and shaken to a uniform consistency. The indicated reagent was added and the container was sealed and placed in a tumbler heated at 45° C. for 30 hours. The resulting starch slurry was cooled to room temperature and adjusted to pH 7.5 with HCL. The starch was then filtered, washed three times with 100 ml of distilled water and twice with 100 ml isopropanol, and air dried. It was analyzed by titration.

The reactions are summarized below.

| Cationic Starch Base* | Acetal Reagent (%) | NaOH (%) | Reaction Time (hr.) | CHO by Titration |
|---|---|---|---|---|
| Waxy Maize | 10 | 2.25 | 6 | 0.16 |
| Waxy Maize | 10 | 2.25 | 18 | 0.50 |
| Waxy Maize | 10 | 2.25 | 30 | 0.88 |

*Treated with 3% diethylaminoethyl chloride hydrochloride (DEC) prior to treatment with the acetal reagent. The DEC reaction was carried out according to the method described in Example III of U.S. Pat. No. 4,243,479 issued January 6, 1981 to M. M. Tessler. The starch contained 0.27% N.

Part C - Preparation of The Aldehyde-Containing Starch Ether Derivative

The starch acetals were converted to the corresponding aldehyde by slurrying the acetal in water (e.g., 100 parts of water/10 parts of starch) and adjusting the pH to 2.0–2.5.

The slurry is heated to 35° C. with agitation for 18 hours. The starch is then neutralized to pH 7.5, filtered, washed three times with distilled water, and air dried.

Part D - Reaction of The Starch-Containing Aldehydes with Ethanol Amine

A 10.0 g sample of aldehyde starch was slurried in 100 ml of distilled water and the pH adjusted to 7.0–7.5. A two-fold excess of the theoretical amount of ethanol amine was added to the slurry and allowed to stir for 2–4 hours without heating. The slurry was then filtered, washed three times with 100 ml of distilled water, and air dried. The amount of nitrogen incorporated was analyzed by Kjeldahl titration. Typically, the nitrogen levels correspond to 80–90% of the available aldehydes.

EXAMPLE II

This example describes the preparation of an acetal-containing starch ester derivative having the structure

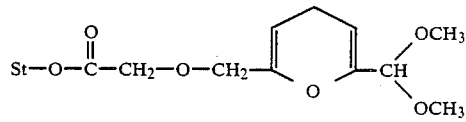

and the aldehyde derivative having the structure

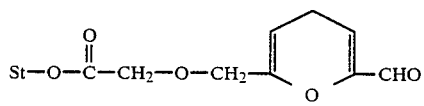

Part A - Preparation of The Acetal-Containing Reagent

A reagent having the structure

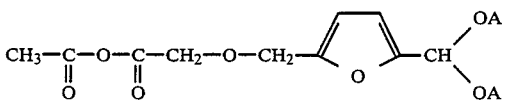

is prepared by dissolving sodium hydroxide (5.1 g, 0.12 mole) in 100 ml of distilled water and adding this solution to a reaction vessel equipped with a three neck round bottom flask equipped with a magnetic stir bar, reflux condenser, and gas inlet. Chloroacetic acid (5.5 g, 0.058 mole) is added to the solution and stirred until it dissolves. 5-Hydroxymethylfurfuraldehyde dimethyl acetal (10 g, 0.058 mole) is then added. The reaction mixture is heated to 50°–70° C. and maintained overnight with stirring under an inert atmosphere. The pH is adjusted to 7.0–7.5 with 3M hydrochloric acid. The reaction mixture is then extracted three times with 50 ml of toluene, dried over magnesium sulfate, filtered, and the solvent removed under vacuum. The resulting material is then redissolved in 100 ml toluene and collidine (7.8 g, 0.064 mole) is added. The reaction mixture is cooled to 5° C. in an ice bath and acetyl chloride (4.5 g, 0.058 mole) is added dropwise over thirty to fourty-five minutes while keeping the temperature from rising above 5° C. After the addition is complete, the reaction is allowed to warm slowly to room temperature and stirred overnight. The mixture is then washed three times with 100 ml of cold water, dried over magnesium sulfate, filtered, and the solvent removed under vacuum. The product may be used without further purification.

Part B - Preparation of an Acetal-Containing Starch Ester Derivative

A total of 100 g of starch is slurried in 150 g of water and the pH is adjusted to 8.0–8.5. The above reagent (10 g) is added to the slurry and sodium hydroxide is added, either manually or automatically, so as to maintain the pH between 8.0 and 8.5. The reaction mixture is allowed to stir for 8 hours while maintaining the pH constant. The pH of the slurry is then adjusted to 7.0–7.5, and the slurry is filtered, washed three times with 100 ml of water, and air-dried.

Conversion of the acetal to the aldehyde can be accomplished as described in Example I. The subsequent reaction of the aldehyde with various amines can be accomplished as described hereafter. It should be noted that starch esters of this type are labile at a pH above 9.0, thus highly alkaline applications should be avoided.

EXAMPLE III

This example describes the modification of cellulose with 5-glycidoxymethyl furfuraldehyde dimethyl acetal and reaction of the aldehyde-containing cellulose with an amino silane.

Part A - Preparation of The Aldehyde-Containing Cellulose Derivative

To a one liter three-necked flask equipped with an overhead stirrer, heating mantle, and reflux condenser was added 650 ml of acetone and 75 g of cellulose with stirring to prevent lumps. Sodium hydroxide (1.5 g) dissolved in water 15 ml) was added dropwise to the slurry with good stirring. The 5-glycidoxymethyl furfuraldehyde dimethyl acetal (7 g) was added, and the reaction mixture was refluxed for four hours, cooled to room temperature, filtered, washed with acetone/water (80/20) three times, with acetone one time, and air dried. The acetal was converted to aldehyde as described above. Analysis for aldehyde by titration showed 1.02% by weight.

Part B - Reaction of The Aldehyde-Containing Cellulose Derivative With Amino Silane The reaction was carried out as in Part D of Example I using 2.0 g. of 3-aminopropyl triethoxysilane. The derivative contained 0.3% nitrogen.

EXAMPLE IV

This example describes the derivatization of guar gum with 5-glycidoxymethyl furfuraldehyde dimethyl acetal (GMFA).

Part A - Preparation of The Aldehyde-Containing Guar Gum

To a 500 ml three-necked flask equipped with an overhead stirrer, heating mantle, and reflux condenser were added 2 g of sodium hydroxide dissolved in 40 ml of water and 160 ml of acetone, followed by the rapid addition of 100 g of guar gum. 5-Glycidoxymethyl furfuraldehyde (10 g) was added. The reaction mixture was heated to reflux and maintained for four hours. The reaction is then cooled, filtered and the filter cake washed twice with 200 ml of acetone/water (80/20), once with 200 ml of acetone, and air-dried. Analysis for aldehyde by tritation showed 0.25% by weight.

Part B - Reaction of The Aldehyde-Containing Guar Gum With Ethanol Amine

The reaction was carried out as in Part D of Example I. The derivative contained 0.3% nitrogen.

EXAMPLE V

This example describes the reaction of aniline with the aldehyde-containing derivative of corn starch prepared from Part C of Example I to give a derivative having the structure

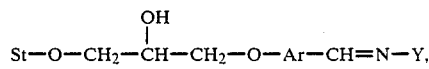

where Ar is

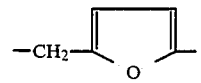

and Y is

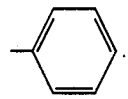

The reaction was carried out as in Part D of Example I but using refluxing ethanol instead of water as the reaction medium. The derivative contained 0.11% nitrogen.

EXAMPLE VI

This example describes the preparation of starch derivatives containing trialkoxysilanes by reaction of a starch aldehyde with a compound of the structure H2NCH2CH2CH2Si(OC)3.

A granular aldehyde-containing starch was prepared as described in Example I. A 10.0% slurry (e.g, 10 parts of starch/90 parts distilled water) was prepared and the pH adjusted to 7.0–7.5. A 2.0 g aliquot of 3-aminopropyltriethoxysilane (0.009 mole, 100% excess based on aldehyde titration) was added to the slurry and allowed to stir for four hours at room temperature. The slurry was then filtered, washed three times with 100 ml of distilled water, two times with 100 ml of isopropanol, and air dried. The nitrogen content was 0.65%.

EXAMPLE VII

This example describes the preparation of starch derivatives containing long chain polyethylene glycols by reactions of aldehyde-containing starches with compounds of the structure

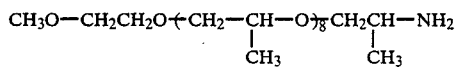

The granular aldehyde-containing starch was prepared as described in Example I. Starch was slurried in water to make 100 ml of a 10% solids (e.g., 10 parts of starch/90 parts of water) and the pH adjusted to 7.0–7.5. 2.95 g Jeffamine M-600 (which was 100% excess based on aldehyde titration of the starch) was added to the slurry and allowed to stir for the appropriate amount of time. The starch was then filtered and washed three times with 200 ml of distilled water. The aldehyde and nitrogen contents were determined.

| Base Starch | % Aldehyde by Titration | Reaction Time (Hr.) | % Nitrogen by Kjeldahl |
|---|---|---|---|
| Corn | 0.77 | 1 | 0.154 |
| Corn | 0.77 | 2 | 0.153 |
| Corn | 0.77 | 24 | 0.171 |

EXAMPLE VIII

This example describes the direct preparation of an aldehyde-containing starch derivative and its reaction with ethanol amine.

Part A - Preparation of The Aldehyde-Containing Reagent

5-Chloromethyl-2-anisaldehyde (CMAA) was prepared by adding a total of 34 g (0.25 mole) of o-anisaldehyde to a two-necked 250 ml. round bottom flask equipped with an overhead stirrer. To this was added 150 ml of concentrated HCl and 13.5 g paraformaldehyde (0.15 moles). The reaction mixture was stirred at room temperature for 48 hours. The precipitated chloromethyl derivative was filtered off, washed with water several times, resuspended in methylene chloride, washed with 100 ml of 0.5% NaHCO solution three times and then with water until neutral. It was dried under vacuum. The yield was 87%. The $^{13}C$ NMR and PMR analysis were consistent with the above structure ($C_9H_9O_2Cl$).

Part B - Preparation of The Aldehyde-Containing Starch Derivative

To a three-necked 500 ml. round bottom flask equipped with a stirrer, heating mantle, and condenser were added 150 ml distilled water, 30 g sodium sulfate, and 0.8 g sodium hydroxide (0.02 mole). The mixture was stirred for about 5 minutes, and 100 g corn starch were added. The pH was about 11.5.

A total of 10 g of 5-chloromethyl-2-anisaldehyde was weighed in a 100 ml. beaker and 45 ml. of tetrahydrofuran were added. The solution was added dropwise to the starch slurry with mixing. No pH change was observed after stirring for 10 minutes at room temperature. The reaction mixture was heated to 50° C. The pH slowly dropped but was maintained above 11.0 by the slow addition of 3% sodium hydroxide. After 20 minutes the pH remained constant at 11.1–11.9. The slurry was maintained at 50° C. with stirring overnight. The starch was recovered by adjusting the pH to 7.0–8.0 with 3% HCl, filtered, resuspending the cake, filtered and washed three times with 200 ml of water, washed two times with 200 ml of acetone, and air dried. The reaction with ethanol amine was carried out as in Part D of Example I. N was 0.13%.

EXAMPLE IX

This example describes the preparation of starches containing proteins by reaction of the aromatic aldehyde with an amino acid amine.

The granular aldehyde-containing starch (100 g) was prepared as described in Example I and slurried in 150 ml of distilled water. Sodium caseinate (5.0 g) was added to the slurry. The slurry was stirred for 30 minutes, the pH was then adjusted to 12, and the mixture was stirred for 18 hours at 35° C. The slurry was then neutralized to pH 7–8, filtered, washed three times with 300 ml of water, and air dried. The nitrogen content was 0.15%.

EXAMPLE X

The reaction of the starch aldehydes with amines is carried out with the starch aldehyde in the dispersed form using an aqueous-solvent system. Corn starch was modified with the indicated aldehyde reagent as described in Example IV. The modified starch (12.0 g) was suspended in water (96.0 g) and the pH was adjusted to 2.5. The slurry was cooked in a boiling water bath for 20 minutes to disperse the starch and liberate the aldehyde. The amine reagent was added and the mixture was stirred until cool, neutralized to a pH of 7–8, and precipitated from solution using standard solvents (e.g., acetone, iso-propanol, ethanol, etc.). The resulting starches were analyzed for nitrogen. The results are shown below.

| Starch Base | Aldehyde Reagent | Amine Reagent | % N |
|---|---|---|---|
| Corn | GMFA | Ethanol amine | 0.25 |
| Corn | GMFA | Aniline | 0.04 |

The results shown that the aliphatic amine is preferred for this type of reaction. There was little or no reaction with the aromatic amine, with the nitrogen content being no higher than that typical of the base corn starch.

EXAMPLE XI

This example describes the utility of starches containing long chain polyethers of the general structure

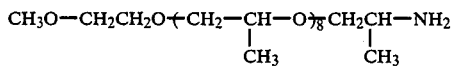

A slurry of 2 g of the derivatized starch in 100 ml of water was cooked for 20 minutes in a boiling water bath at neutral pH. The starch was cooled to room temperature before being used. The inside of an eight ounce jar was coated with 1 g of crude oil and the starch added and shaken well. The ability to remove the oil from the glass and suspend the oil (e.g., keep it from floating to the top; were used to evaluate the effectiveness of the emulsifier.

The results are summarized below.

| Base Starch | % Nitrogen by Titration | Effectiveness (after 5 min.) |
|---|---|---|
| Corn | none | poor |
| Corn | 0.15 | fair |
| Corn | 0.17 | fair |

EXAMPLE XII

This example indicates the utility of siloxane-containing starches as glass coatings.

A slurry containing 5% solids (e.g., 5 parts starch/95 parts water) was prepared with the appropriate siloxane-containing starch. See Example VI for details on the preparation of the modified starches. The starch slurry was then heated in a boiling water bath for 20 minutes without any pH adjustment to partially disperse the starch. An alternative method for dispersing the starch was to heat the slurry in a pressure vessel at 15 psi (approximately 121° C.-250° F.). Once dispersed a starch film was cast onto a glass plate with one edge of the film covering a piece of Mylar. The purpose of the Mylar was to provide a means for peeling the film from the glass. Film thicknesses were in the range of 5-30 mils (thousands of an inch). This variable had no effect on the glass adhesion.

The subjective evaluations are summarized below. A rating of excellent indicated the film could not be removed without breaking the supporting glass. A rating of very good indicated the film was the most difficult to remove without damaging the glass substrate. A rating of good indicated that there was an improvement in glass adhesion over that observed with the base starch (i.e., the unmodified raw starch). A rating of average indicated the film was as easily removed from the glass as a regular (i.e., unmodified) corn or waxy corn starch.

| Base Starch | Percent Treatment | Glass Adhesion |
|---|---|---|
| High amylose* | 10 | excellent |
| High amylose* | 5 | very good |
| High amylose* | 2 | very good |
| High amylose* | 0 | average |
| Potato | 10 | excellent |
| Potato | 5 | excellent |
| Potato | 1 | good |
| Potato | 0 | good |
| Waxy corn | 10 | very good |
| Waxy corn | 0.75 | good |
| Waxy corn | 0 | average |

-continued

| Base Starch | Percent Treatment | Glass Adhesion |
|---|---|---|
| Corn | 0 | average |

*50% amylose

EXAMPLE XIII

This example, like the example in U.S. Pat. No. 4,166,872 (cited in the Background), describes the preparation of a typical size using any one of the siloxane-containing starches of Example VI.

| Siloxane-containing Starch | 4.9 |
|---|---|
| Hydrogenated vegetable oil | 1.18 |
| Polyoxyethylene sorbitan monooleate | 0.19 |
| Tetraethylene pentamine distearate | 0.22 |
| Polyethylene glycol | 1.15 |
| Water | Remainder |

A forming size composition is prepared from the above ingredients by placing all of the starch and one-half of the water in a suitable receptacle, adjusting the pH to 6.0±2.0 with hydrochloric acid and cooking the starch. The vegetable oil and polyoxyethylene sorbitan monooleate are then separately admixed at 150°-170° F., agitated until the inversion of the emulsion and preferably homogenized at 2000 pounds per square inch and the emulsion, the tetraethylene pentamine distearate and the remainder of the water are added to the starch cook and agitated. While the starch in the process above-described is cooked in conventional equipment using conventional techniques as, for example, an open tank or receptacle at substantially atmospheric temperature and pressure, other suitable methods of cooking the starch can be used.

Now that the preferred embodiments of the invention have been described in detail, various modifications and improvements thereon will become readily apparent to those skilled in the art. Accordingly, the spirit and scope of the present invention are to be limited only by the appended claims and not by the foregoing specification.

What is claimed is:

1. A polysaccharide derivative having the structure Sacch—O—Z—Ar—CH=N—Y or

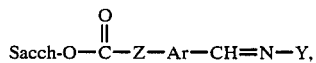

where Sacch—O— represents a polysaccharide molecule; Z is —(CH$_2$)n— or

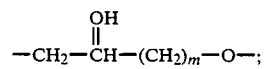

Ar is a divalent aromatic group; Y is a multivalent group derived from a water-soluble protein containing more than one primary amine group; n is one or greater; and m is zero or greater.

2. The derivative of claim 1, wherein, in Z, n is 1.

3. The derivative of claim 1, wherein Z is —CH$_2$— and Ar has the structure

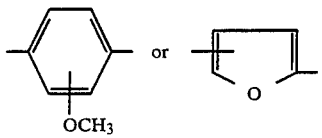

4. The derivative of claim 1, wherein Z is

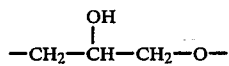

and Ar has the structure

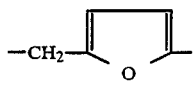

or Z is —CH₂— and Ar is

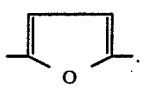

5. The derivative of claim 1, wherein Y is derived from sodium caseinate.

6. The derivative of claim 1, wherein the polysaccharide is a starch in granular or dispersed form.

7. The derivative of claim 6, wherein the starch is a waxy corn, corn, high amylose corn, potato, rice, sweet potato, or tapioca starch.

8. The derivative of claim 7, wherein the starch contains one or more cationic, anionic, nonionic or zwitterionic groups, with the proviso that the cationic groups are not free primary amine groups.

9. The derivative of claim 8, wherein the starch is waxy corn, corn, high amylose corn, or potato starch.

10. The derivative of claim 9, wherein the starch contains cationic groups.

11. The derivative of claim 1, wherein the polysaccharide is a gum.

12. The derivative of claim 10, wherein the gum is guar gum.

13. The derivative of claim 1, wherein the polysaccharide is a cellulose or a cellulose derivative.

14. The derivative of claim 10, wherein the cationic groups are tertiary amino groups.

15. The derivative of claim 14, wherein the tertiary amino groups are diethylaminoethyl ether groups.

16. The derivative of claim 10, wherein the cationic groups are quaternary amine groups.

17. The derivative of claim 16, wherein the quaternary amine groups are 3-(trimethylammonium chloride)-2-butenyl groups.

* * * * *